Patented July 26, 1932

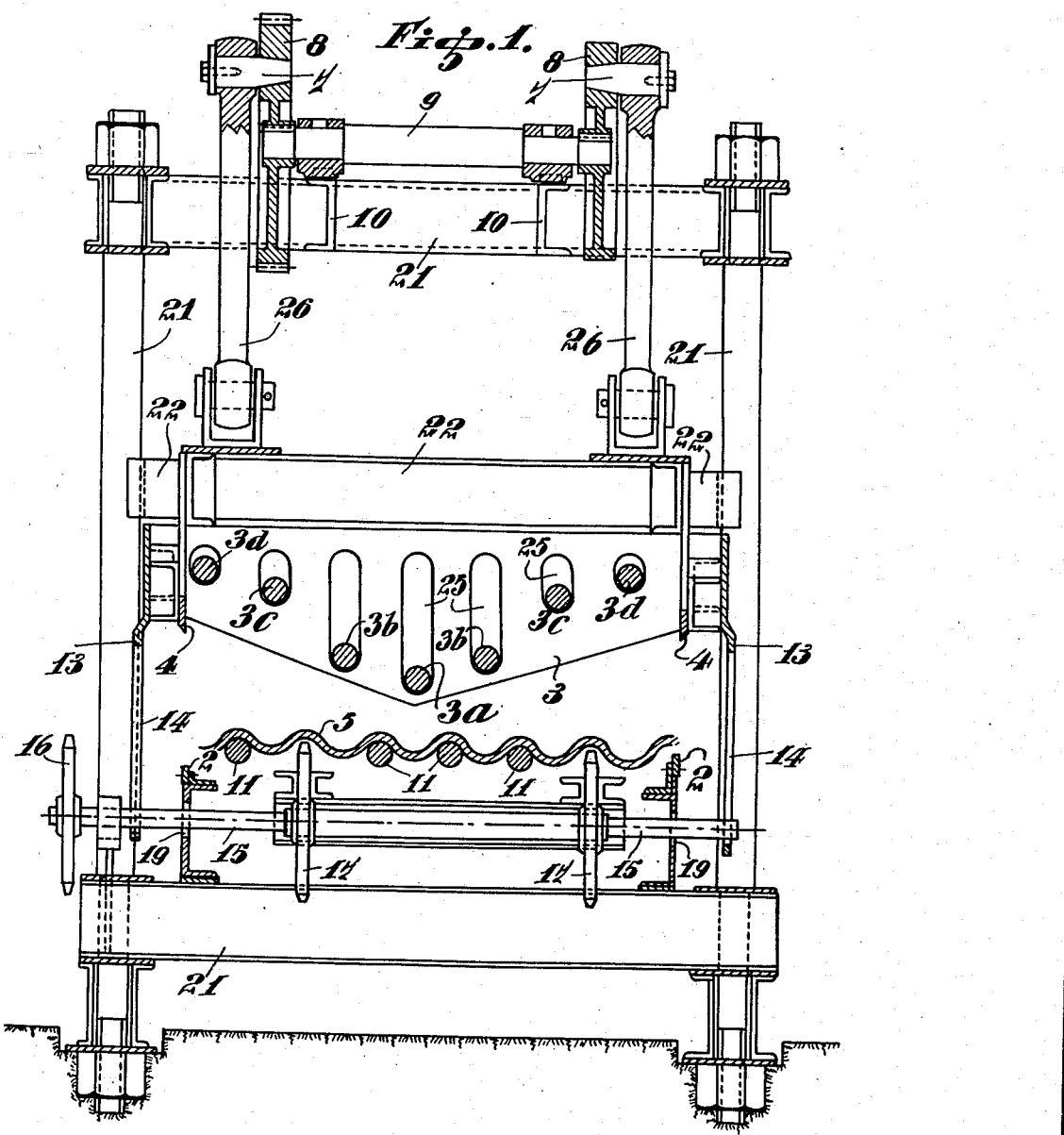

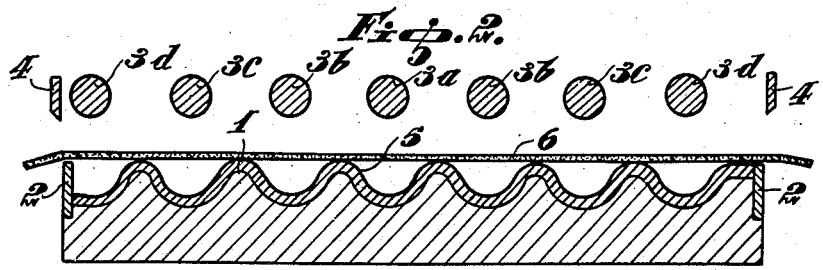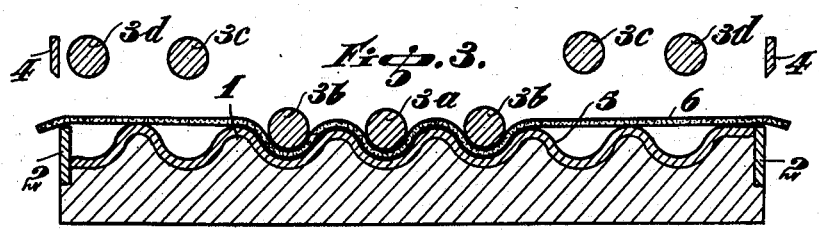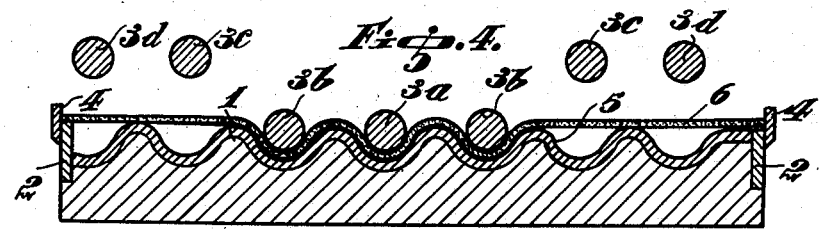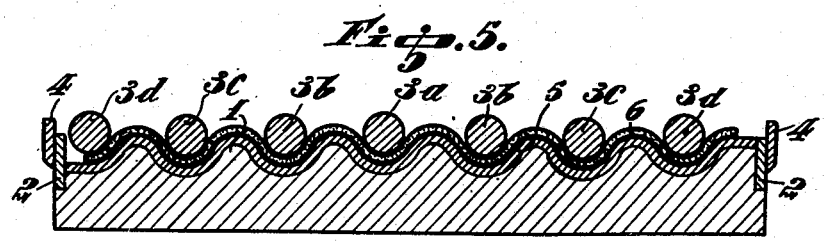

1,868,645

UNITED STATES PATENT OFFICE

LÉON SCHEERDERS-VAN KERCHOVE, OF ST. NICOLAS-WAES, BELGIUM, ASSIGNOR TO USINES REUNIES SCHEERDERS-VAN KERCHOVE, SOCIETE ANONYME, OF ST. NICOLAS-WAES, BELGIUM

APPARATUS FOR SIMULTANEOUSLY CORRUGATING AND TRIMMING SHEETS OF ASBESTOS-CEMENT AND THE LIKE IN A PLASTIC CONDITION

Application filed April 30, 1930, Serial No. 448,709, and in Belgium October 26, 1929.

The present invention consists in an improved process for simultaneously shaping and trimming corrugated sheets of asbestos-cement or the like when in plastic condition, the operations being very simple and allowing of recovering the waste.

The invention also consists in a machine arranged for carrying the process into practice.

In order to point out the advantages of the new process, it is useful to explain in short terms the known manner of working, as also its inconveniences.

The plastic sheet as it leaves the cardboard machine cylinder, is carried to a press in which it is cut at suitable dimensions. Afterwards the sheet is placed upon a pattern mould made of steel, and both are engaged in the corrugating apparatus. The corrugations are obtained in a known manner, by means of bars engaging the corrugations of the mould, so as to oblige the plastic sheet to conform itself to the corrugations. After this operation, the sheets are stored for drying purposes.

The sheets which have been worked in this way often present irregular edges and differences in width which can reach to 50 m/m. It has been proposed to obviate this drawback by afterwards trimming the hardened sheets, but it is obvious that such operation results in a loss of the severed material and constitutes a supplementary manipulation during which plates become damaged or broken. This means a loss of not less than 5% of the value of the material under treatment and this percentage is too high in consideration of the value of the raw materials used.

All these drawbacks are eliminated by the present invention, by which the simultaneous corrugating and trimming of the edges are effected without any loss of waste.

The process consists in placing the plastic sheet of asbestos-cement upon a support affording pattern corrugations, forming in the sheet the corrugations starting from the central portion, through the introduction of elements engaging the corrugations of the pattern mould, cutting the plastic sheet along its lateral edges and finally forming the other outer corrugations. As the sheet is in plastic condition, the waste can be returned to the mixing machine where the raw materials are treated.

The machine according to the present invention comprises a frame in which the pattern mould rests upon a support, the frame being also provided with fixed cutting blades, whereas a vertical reciprocating frame supports the bars used for engagement with the corrugations of the pattern mould. Said bars are arranged in V-disposition resting in vertically arranged slots, so that the bars of the central part will firstly engage the pattern plate, and said movable frame bearing also movable blades for shearing the lateral edges of the sheet before the outer bars will engage the corrugations of the mould. The movable frame of the machine is preferably driven by means of an eccentric, whereas the upward movement of the movable frame bearing the bars lifts a rotating shaft provided with chain wheels, said chains acting to carry the model plate and the plastic corrugated sheet out of the machine, immediately after said bars have been lifted out of the mould.

The invention will be described hereafter with reference to the accompanying drawings, in which:

Fig. 1 is a front elevation, partly in section, of a machine constructed for the working of this process;

Figs. 2, 3, 4 and 5 are diagrammatic transverse sections illustrating the succession of operations forming the process.

For performing the different operations of the process, use is made of a table 1, supporting laterally arranged fixed knives or cutting blades 2, the distance separating these blades being determined in accordance with the shape of the corrugations wanted. The upper side of this table is so formed that it suits the corrugations on the model plate 5, which is preferably made of steel. Over the model plate are suspended bars 3a, 3b, 3c, 3d, of circular cross section, adapted to form the necessary corrugations. Furthermore, two movable knives or cutting blades 4 cooperate with the fixed blades 2 for a shearing action.

Upon the table 1 is placed the pattern plate 5 and over this is stretched the plastic sheet 6. The corrugations of the central portion are firstly fixed by lowering the bars 3a, 3b. After this, the movable knives 4 are lowered, so that the lateral waste of the material is cut off. The bars 3c and the bars 3d are now lowered to complete the formation of the corrugations in the sheet supported by the pattern mould.

It is obvious that the corrugated sheets obtained by this treatment in the machine for corrugating and trimming will no more present differences in width and no further trimming of the edges will be necessary.

The cut off edges of the plastic sheet can immediately be brought back to the plant treating the raw materials before engagement in the cardboard machine.

In Fig. 1 is illustrated a machine for the execution of the different operations by one manipulation only. This machine comprises an open rectangular frame 21, in which can move a rectangular frame 22 which is suitably guided along the uprights of the frame 21. This movable frame 22 is provided at each end with a plate 23, in the vertical slots 25 of which are resting the bars 3a, 3b, 3c, 3d substantially of circular section, said bars being arranged in V-disposition. The frame 22 is pivotally suspended by rods 26, the pivot 7 of which is eccentered upon pulleys 8 mounted upon a shaft 9 mounted in bearings supported by the transverse girders 10. The model plate 5 is made of steel and rests upon longitudinal bars 11; said bars, however, could be replaced by a table as illustrated in Figs. 2 to 5. The frame 22 is provided with a vertical slot 14, in which a shaft 15 is engaged. The sprocket wheel 16 of this shaft is rotated by means of a chain transmission. Said shaft 15 bears in its central portion and underneath the model plate 5, chain wheels 17, the chains of which will act as transporting means. 2 are the knives supported by the section irons which afford vertical slots 19 allowing a vertical reciprocating movement of said shaft 15. It is understood that the downward movement of the frame 22 allows (1) to put the circular bars 3a, 3b in the central portion of the sheet to be corrugated; (2) to shear by means of the knives 4 the lateral edges of the sheet and (3) to place the remaining bars 3c and 3d to complete the corrugating of the sheet.

When the bars 3a, 3b, 3c, 3d are lifted from the sheet 6, the members 13 are engaged in this movement up to the moment when the shaft 15 reaching the end of the slot 14 is lifted, so that the transporting chain wheel 17 can act upon the model 5. By rotation of the shaft 15, said model plate 5 will be shifted together with the corrugated sheet resting upon the mould.

This machine executes the different operations during one revolution of the driving pulleys 8.

It must be understood that other means of operating can be proposed to vary the number of bars engaging the corrugations before or after the cutting operation, without departing from the scope of the present invention.

I claim:

A machine for corrugating and trimming sheets of asbestos-cement when in plastic condition, comprising an open framework, a corrugated plate of steel forming a mould and supported by longitudinal bars, fixed knives arranged on both sides of and close to the pattern mould, a rectangular frame movable and guided along the uprights of the fixed frame, partitions arranged endwise of the movable frame and having substantially vertical slots of variable dimension to lodge a number of bars arranged parallel to the corrugations of the pattern mould, the slots being of increasing depth towards the central portion, knives supported by the movable frame to shear the edges of the asbestos-cement sheet in cooperation with the fixed knives, the arrangement being such that said shearing action occurs before the outer bars will engage the corrugations of the mould, means to reciprocate the movable frame, a shaft underneath the pattern mould, chain wheels upon said shaft, means to lift the shaft so that its chain wheels engage the pattern mould when all the bars are released from same and carry the corrugated sheet and mould out of the machine.

In testimony whereof I signed hereunto my name.

LÉON SCHEERDERS-VAN KERCHOVE.